Figure 1:
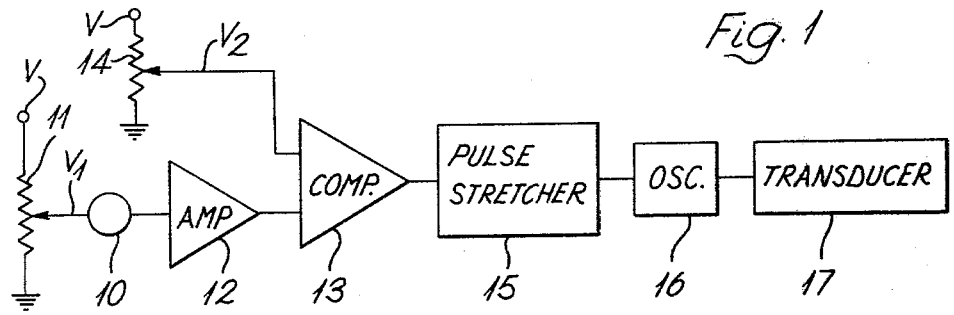

United States Patent [19]

Martin et al.

[11] 4,319,081

[45] Mar. 9, 1982

[54] SOUND LEVEL MONITORING APPARATUS

[75] Inventors: Michael C. Martin, Kingston upon Thames; Ian R. Summers, Exeter, both of England

[73] Assignee: National Research Development Corporation, London, England

[21] Appl. No.: 74,767

[22] Filed: Sep. 11, 1979

[30] Foreign Application Priority Data

Sep. 13, 1978 [GB] United Kingdom ............... 36644/78

[51] Int. Cl.³ ...................... H04R 25/00; G01D 7/00
[52] U.S. Cl. ................................. 179/1 MN; 340/407;
340/366 R
[58] Field of Search ............ 179/1 P, 1 MN; 307/360;
328/148, 150; 340/366 R, 371, 407

[56] References Cited

U.S. PATENT DOCUMENTS

| | | | |
|---|---|---|---|
| 868,621 | 10/1907 | Zelenka | 340/407 |
| 2,969,530 | 1/1961 | Duncan | 179/1 MN |
| 3,133,990 | 5/1964 | Seeley | 179/1 P |
| 3,268,856 | 8/1966 | Wallen | 179/1 P |
| 3,480,912 | 11/1969 | Speeth et al. | 340/366 R |
| 4,142,067 | 2/1979 | Williamson | 179/1 MN |
| 4,237,449 | 12/1980 | Zibell | 340/407 |

FOREIGN PATENT DOCUMENTS 2601661  7/1977  Fed. Rep. of Germany ...... 179/1 P

OTHER PUBLICATIONS

Edwards, "LED Levelmaster", Electronics Australia, vol. 38, No. 3, pp. 48-49, 51, 125, 6/76.
Electronics World, 3/68 "Silence Pollution", pp. 58-59.

Primary Examiner—Stuart N. Hecker
Attorney, Agent, or Firm—Cushman, Darby & Cushman

[57] ABSTRACT

Sound level monitoring apparatus for a deaf person comprises a microphone, a discriminator connected to the microphone to provide an output signal in response to the attainment of a predetermined sound level threshold in the ambient sound detected by the microphone, and a sensory transducer responsive to the discriminator to provide a representation of the output signal. In use the threshold suitably represents the normal speech level of the user, and may be adjustable, and the transducer accordingly indicates whether the user should raise or lower his speech level in a given environment. The apparatus can operate in association with several thresholds with the lowest denoting normal speech and with one or more transducers providing respectively, mutually distinctive representations. The transducer or transducers can be of visual form, with use of differently colored light outputs or of vibratory tactile form, with different operating frequencies.

5 Claims, 3 Drawing Figures

SOUND LEVEL MONITORING APPARATUS

This invention concerns sound level monitoring apparatus and more particularly such apparatus for the deaf.

Particular difficulties for the deaf arise from their inability to monitor their own speech level and also to adjust the same to take account of background noise. An object of the present invention is to improve this situation and to this end there is provided sound level monitoring apparatus comprising a microphone, a discriminator connected to the microphone to provide an output signal in response to the attainment of a predetermined sound level threshold in the ambient sound detected by said microphone, and sensory transducer connected to the discriminator to provide for a deaf person a representation of said output signal.

In one form of the invention a single transducer is used and the predetermined threshold is adjustable. In this case the threshold is set to correspond to a normal speech level so that the transducer indicates to the deaf user whether his speech level is too low or too high.

In another form of the invention at least one transducer is employed in association with a plurality of predetermined sound level thresholds, and the transducer or transducers are differentially operable to represent such thresholds. In this case a deaf user is made aware of variations in the ambient sound and can adjust his own speech level accordingly.

It will be evident that these two forms of the invention can be combined, with one of the thresholds of the second form, suitably the lowest, assuming the role of the threshold in the first form of the invention.

Different forms of transducer can be employed in application of the present invention, such as visual and tactile transducers.

In the case of the second or combined forms of the invention, a plurality of transducers can be employed to respectively indicate the output signals indicating the thresholds, or a single transducer can be differentially operated to indicate these signals. In the initial development of the invention a plurality of visual detectors in the form of light emitting diodes have been employed in one embodiment to respectively represent respective output signals, these diodes being differently coloured in operation, and in another embodiment a single, vibratory, tactile transducer has been employed to represent different output signals by operation at respectively different frequencies.

Also, in practice, and particularly with the last-mentioned forms of the invention, it is appropriate that the discriminator and transducers should operate in response to the microphone so that the user is aware of discrete sound level peaks passing through the relevant thresholds and also of the frequency of such peaks. Ideally the response should be instantaneous and indicate all such peaks, but in practice this is not necessary providing that the operation does not involve any significant integrating function and indicates sufficient peaks at the various thresholds to indicate the general pattern of ambient sound. Such an operation is readily achieved when a plurality of transducers are employed. When a differentially-operated transducer is employed, not all peaks can be indicated because the transducer must operate for a sufficient time in response to any one peak to allow the relevant form of representative operation to be recognised. It is desirable that peak sound levels above the higher thresholds should not be missed, and it is accordingly appropriate to employ a preferential form of operation whereby transducer operation to represent detection of a higher threshold overrides such operation in respect of a lower threshold.

Regarding the recognition of different operational modes for a single transducer, it has been found that this is facilitated with a vibratory tactile transducer by the use of very low operational frequencies, preferably less than 30 Hz.

A further practical consideration is that the apparatus is preferably bodily portable by a user.

Figure 2:
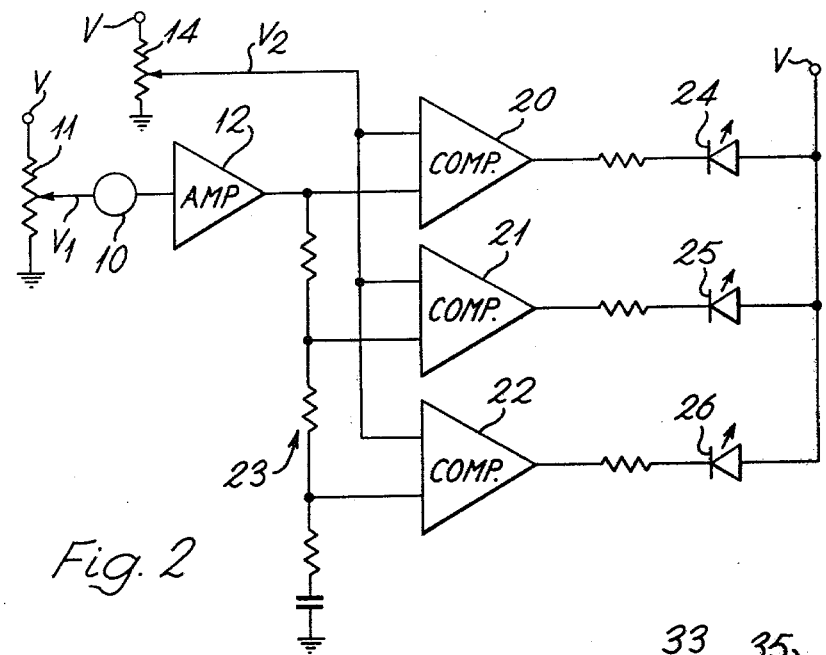
Figure 3:
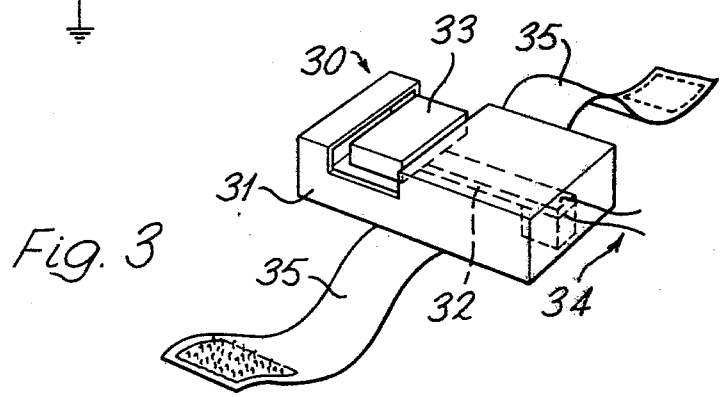

In order that the invention may be more clearly understood, the same will now be further described by way of example with reference to the accompanying drawings, in which:

FIG. 1 schematically illustrates an embodiment of the first form of the invention;

FIG. 2 similarly illustrates an embodiment of the combined forms of the invention; and FIG. 3 diagrammatically illustrates one form of tactile transducer suitable for use with the present invention.

The embodiment of FIG. 1 is intended for use with a vibratory tactile transducer, such as that of FIG. 3 described hereinafter, and comprises a microphone 10 operated at a preset D.C. bias $V_1$ from a potentiometer 11. The output from the microphone is applied, through an A.C. amplifier 12 with unity D.C. gain, to a voltage comparator 13 which has a second preset input $V_2$ from a further potentiometer 14. Voltage $V_2$ is set higher than $V_1$ to represent a sound level threshold and the microphone output will be such as to generate an output from the comparator during such excursion of the combination of the microphone output and voltage $V_1$ above voltage $V_2$. The comparator output is applied to a pulse stretcher 15, from which output pulses activate an oscillator 16 and thence a transducer 17.

It will be noted that the sound level threshold is adjustable by way of voltages $V_1$ and $V_2$, usually $V_2$. Also, A.C. operation is preferred since rectification of the microphone output would inevitably introduce a time constant factor and detract from indication of peak sound levels. The pulse stretcher is employed so that the transducer is operated for a sufficient period regardless of the duration of a sound peak above the relevant threshold.

Turning to the embodiment of FIG. 2, this corresponds in part to that of FIG. 1 and the same reference numerals are used where appropriate. The difference arises in FIG. 2 by use of three voltage comparators 20, 21, 22 each similar to 13 and responsive to voltages $V_1$ and $V_2$. However, voltage $V_1$ is applied to the three comparators from respectively different points of a resistor chain 23 so that the comparator outputs represent successive thresholds. These last outputs are applied to respective visual transducers in the form of differently colored light emitting diodes 24, 25, 26.

In use of this embodiment the diodes 24 to 26 are activated at successively increasing thresholds, and the lower threshold is suitably adjusted by way of voltage $V_2$ to represent a normal speech level for the user. In fact, it will be seen that the three thresholds are adjusted together in this way. As to the differences between successive thresholds, these are suitably set at about 10-20 dB.

The remaining FIG. 3 shows a vibratory tactile transducer developed for use with the present invention, but possibly capable of other applications. The transducer is denoted generally at 30 and comprises a rectangular box housing 31 of plastics material from which an end portion of one major wall has been removed. An elongate piezoelectric member 32 is mounted, firmly but with some resilience, at the other end of the housing to project longitudinally therefrom adjacent the region of the removed wall portion. At this last region the member 32 carries a sheet 33 of plastics material of similar but smaller dimensions than the removed wall portion. The mounted end of the member 32 is engaged with respective ones of a pair of electrical connectors 34 which, when energised with alternating potentials, cause the member to vibrate with the sheet 33 moving into and out of the housing 31. A remaining feature of FIG. 3 is the provision of straps 35 connected to the housing to allow the latter to be connected to a user's body with the sheet 33 next to the skin.

In the use of the transducer of FIG. 3, it is bodily connected to the user as just mentioned, suitably to a finger, wrist, fore-arm, or elsewhere, with the connectors leading to an oscillator output to form an overall apparatus such as that of FIG. 1.

Preferably the member 32 is activated at a frequency of about 250–300 Hz at which tactual sensitivity is found to be highest. When the transducer is used to indicate different thresholds, this is preferably effected as noted above by the use of respectively different frequencies of low level, and these are suitably provided by way of modulation of the above-mentioned sensitive frequency. In practice a period of activation of about 1 second is found sufficient to allow differential recognition of two suitably proportional low frequencies.

We claim:

1. A method of monitoring the level of ambient sound for a deaf person including the steps of providing adjacent a deaf person apparatus comprising a microphone, a discriminator and a sensory transducer;

selecting and setting in unison a plurality of ambient sound level thresholds which successively differ by 10–20 dB in the discriminator, the lowest ambient sound level threshold in the discriminator representing that of normal speech;

coupling sound signals from the microphone to the discriminator, the discriminator functioning to provide output signals corresponding to a plurality of predetermined sound level thresholds as the ambient sound detected by the microphone reaches levels corresponding to the thresholds;

and coupling the discriminator output signal to the sensory transducer and operating the sensory transducer, so that the sensory transducer provides for the deaf person indications of the ambient sound level in his vicinity as a guide to the speech volume required on his part.

2. A method in accordance with claim 1 wherein the sensory transducer is operated for a period of not less than one second in response to each discriminator output signal coupled thereto.

3. Sound level monitoring apparatus for a deaf person comprising: a microphone; an AC signal discriminator connected to said microphone to provide respective output signals corresponding to a plurality of predetermined sound level thresholds as the ambient sound detected by said microphone reaches levels corresponding to said thresholds, said thresholds successively differing by 10–20 dB; means for adjusting said discriminator to vary said thresholds in unison; and a plurality of differently colored light sources connected to said discriminator respectively to operate in response to said output signals to provide for said deaf person visually distinctive representations of said output signals, whereby said deaf person is apprised of the ambient sound level as a guide to the speech volume required on his part.

4. Sound level monitoring apparatus for a deaf person comprising: a microphone; an AC signal discriminator connected to said microphone to provide outputs corresponding to a plurality of predetermined sound level thresholds as the ambient sound detected by said microphone reaches levels corresponding to said thresholds, said thresholds successively differing by 10–20 dB; means for adjusting said discriminator to vary said thresholds in unison; and a single sensory transducer of vibratory tactile form connected to said discriminator to operate at sensually different frequencies in response to said output signals, said transducer being operable for a period of not less than about one second in response to each occurrence of said output signals.

5. Apparatus according to claim 4 wherein said one transducer is operable at a frequency of about 250–300 Hz with modulation of said different frequencies less than 30 Hz.

* * * * *